United States Patent [19]
Miner

[11] 3,729,908
[45] May 1, 1973

[54] HOUSING FOR A VEHICLE
[75] Inventor: Earl L. Miner, Moran, Kans.
[73] Assignee: Lawlor Industries Inc., Addison, Ill.
[22] Filed: Apr. 21, 1972
[21] Appl. No.: 246,360

[52] U.S. Cl. .................. 56/16.7, 56/199, 15/320, 180/19
[51] Int. Cl. ............................................. A01d 35/22
[58] Field of Search .................. 56/16.7, 16.9, 17.4, 56/2, 10.1, 14.7, 14.8; 15/50 R, 50 C, 49, 320, 98; 180/19, 13

[56] References Cited
UNITED STATES PATENTS

| 2,250,177 | 7/1941 | Boccasile | 15/320 |
| 3,197,798 | 8/1965 | Brown et al. | 15/320 |
| 3,408,801 | 11/1968 | Kroll | 56/199 |
| 3,550,181 | 12/1970 | Dolan et al. | 15/353 |

Primary Examiner—Antonio F. Guida
Attorney—Jack E. Dominik et al.

[57] ABSTRACT

An improved L-shaped housing for a vehicle which is constructed and affixed to the vehicle in a fashion such that the housing can be pivoted to expose the drive mechanisms, the driven members and the like of the vehicle, whereby they can be easily serviced.

4 Claims, 3 Drawing Figures

Patented May 1, 1973  3,729,908

HOUSING FOR A VEHICLE

This invention relates to an improved housing for a vehicle which is constructed to generally cover the drive mechanism as well as any driven members thereof and which is adapted to be pivoted to expose the driven member and the drive mechanism, whereby the drive mechanism and the driven member can be easily serviced.

There are many mechanical devices such as, for example, floor scrubbers, lawn mowers, sweepers and the like, to mention but a few of the various devices to which the invention is applicable, these devices hereinafter being referred to generally as vehicles, having mechanical parts such as drive mechanisms which are enclosed or covered by a housing to not only protect these mechanisms but also to prevent an object or person from accidentally coming into contact with them. In the case of the majority of these various different types of devices, these mechanisms are subject to periodic servicing and, at times, are subject to repair or replacement.

The manner in which the present housings for these vehicles are presently constructed is such that various parts or all of the housing has to be disassembled or removed from the vehicle to gain access to the various different mechanical mechanisms to effect any repairs and/or servicing thereof. The time required to effect these repairs or the servicing of the mechanical mechanisms may be a relatively difficult, time consuming task, even though the repairs and/or servicing itself may be a relatively simple task.

Accordingly, it is an object of the present invention to provide an improved L-shaped housing for a vehicle which is constructed and affixed to the vehicle in a fashion such that the housing can be pivoted to expose the drive mechanisms, the driven members and the like of the vehicle, whereby they can be easily serviced.

Other objects of the invention will in part be obvious and will in part appear hereinafter.

For a fuller understanding of the nature and objects of the invention, reference should be had to the following detailed description taken in connection with the accompanying drawings in which.

Similar reference characters refer to similar parts throughout the several views of the drawings.

Figure 1:
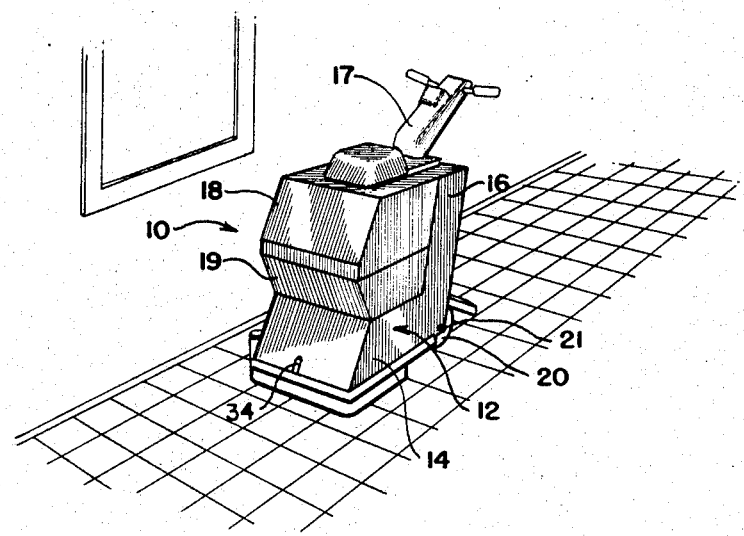
FIG. 1 is a perspective view of a floor scrubber provided with an L-shaped housing constructed and provided thereon in a manner exemplary of the invention.
Figure 2:
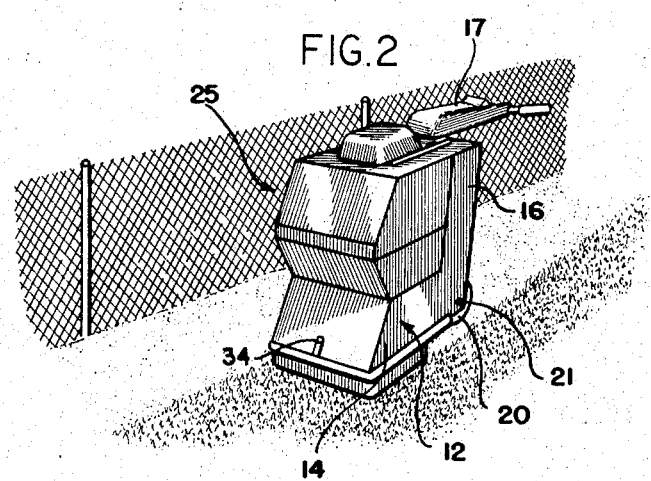
FIG. 2 is a perspective view of a lawn mower having an L-shaped housing constructed and provided thereon in a manner exemplary of the invention.

Referring now to the drawings, in FIGS. 1 and 2, respectively, there is illustrated a floor scrubber 10 and a lawn mower 25, both of which have a generally L-shaped housing 12 constructed and provided thereon, in a fashion such that the driving mechanism and the driven members thereof are generally covered and such that these driving mechanisms and driven members can be easily and quickly exposed for repair and/or servicing. More particularly, the floor scrubber 10 is provided with the L-shaped housing 12, and the latter includes a horizontally extending leg 14 and an upwardly extending leg 16. A handle 17 is affixed to the upwardly extending leg 16, for steering the floor scrubber 10 and for pivoting the L-shaped housing 12 to expose the drive mechanism and the driven members thereof, in the manner described more fully below. The surfaces of the L-shaped housing 12 within the crotch of the legs 14 and 16 provide a surface upon which can be mounted auxiliary equipment, which in the case of the floor scrubber 12, comprises a dirty water tank 18 and a clean water tank 19. A pair of wheels 21 (only one of which is shown) are secured to an axle 21 which is supported by a support frame, such as the support frame 28 illustrated in FIG. 3, which is generally concealed by the L-shaped housing 12. Enclosed within or covered by the L-shaped housing 12 is a scrubber brush or brushes, as well as the driving mechanism for the scrubber brush, all of which is secured to and supported by the support frame. The drive mechanism may also be coupled to the axle 21 and/or wheels 20, to provide a self-propelled vehicle or floor scrubber 10.

The lawn mower 25 of FIG. 2 likewise includes a generally L-shaped housing 12 having a horizontal leg 14 and an upwardly extending leg 16. An axle 21 again is supported by the support frame of the lawn mower 25, and has a pair of wheels 20 affixed thereto for transporting the lawn mower. A handle 17 affixed to the upwardly extending leg 16 is provided for steering the lawn mower. The driven member, in the case of the lawn mower 25, is a rotary cutting blade rather than a scrubber brush, and it, together with the drive mechanism therefor, is enclosed within the L-shaped housing 12. The surfaces of the L-shaped housing 12 within the crotch of the legs 14 and 16, in this case, supports auxiliary equipment in the form of a grass catcher 26.

Figure 3:
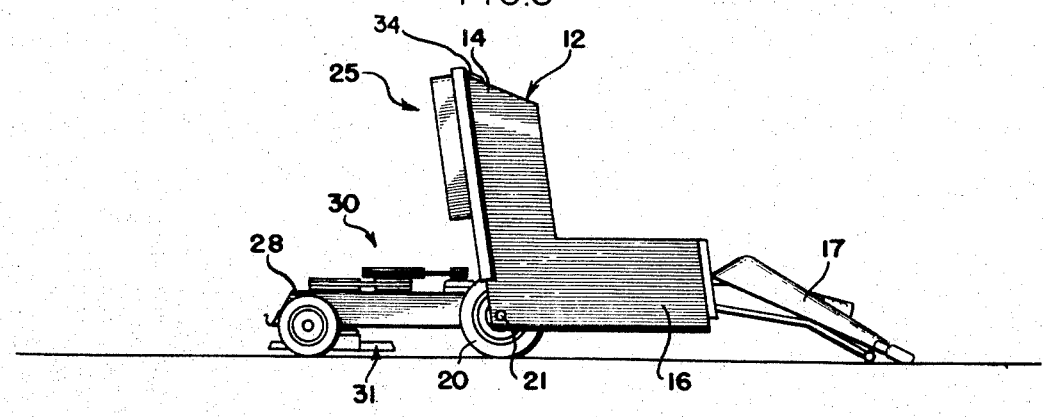
FIG. 3 is a side plan view of a vehicle having an L-shaped housing exemplary of the invention, generally illustrating the manner in which the housing can be pivoted to expose the driven member as well as the driving mechanism thereof.

In FIG. 3, the advantages of the L-shaped housing are apparent. As can there be seen, the L-shaped housing 12 is pivotally attached to and supported on the axle 21 to that it can be pivoted upwardly and rearwardly, as illustrated, to expose the drive mechanism of the vehicle, generally represented by the reference numeral 30, and the driven member 31 thereof, which in the illustrated embodiment comprises a cutting blade so that they can be easily serviced and/or repaired.

The handle 17 is fixedly secured to the upwardly extending leg 16 of the L-shaped housing 12, so that the handle 17 can be used to assist or to pivot the L-shaped housing in the manner illustrated in FIG. 3. To prevent the L-shaped housing 12 from being inadvertently pivotally tilted during use of the vehicle, the forward end of the horizontally extending leg 14 thereof preferably and advantageously has a releasable catch 34 thereon which can be lockingly engaged with its counterpart affixed to the support frame of the vehicle, to effectively lock the L-shaped housing to the support frame to prevent it from being pivoted. When it is desired to pivot the L-shaped housing 12 to expose the drive mechanism thereof, the releasable catch is merely disengaged.

While the L-shaped housing 12, in the illustrated embodiments, are associated with a floor scrubber and the lawn mower, it will be appreciated that a similar L-shaped housing 12 can be provided on various other types of vehicles such as, for example, a lawn sweeper or floor polisher. The essence of the invention is to construct the L-shaped housing in a fashion such that the drive mechanism as well as other mechanical portions of the vehicle are generally enclosed or covered by the L-shaped housing, and the latter is pivotally affixed at a point generally located at the intersection of its horizontal and upwardly extending legs 14 and 16, so that the L-shaped housing can be easily and quickly pivoted upwardly and rearwardly of the support frame of the vehicle upon which the drive mechanism is mounted. The pivots for the L-shaped housing preferably and advantageously are provided by simply attaching and supporting the same on the axle of the vehicle, however, separate pivot point assemblies also can be provided, if desired. It will be appreciated that the L-shaped housing 12 can be fabricated in various different dimensional sizes, to suit the particular apparatus or vehicle to which it is to be affixed. The surfaces of the L-shaped housing 12 within the crotch of the legs 14 and 16 also provide an area upon which auxiliary equipment for the vehicle can be easily and conveniently mounted.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In combination with a vehicle having a support frame upon which is mounted at least one axle rotatably supporting a pair of wheels, a driven member such as a scrubber brush, a rotary cutting blade, a sweeper brush and the like and the drive mechanism for said driven member and said pair of wheels, the improvement comprising a generally L-shaped housing having a horizontal leg which generally covers said support frame and the driven member and the drive mechanism supported thereon and an upwardly extending leg, said housing having the end of said horizontal leg near its intersection with said upwardly extending leg pivotally attached and supported to permit said L-shaped housing to be pivoted upwardly and rearwardly independently of said support frame to expose said driven member and said drive mechanism, whereby said drive mechanism and said driven member can be easily serviced, and a handle fixed to said upwardly extending leg for steering said vehicle and for assisting in pivotally swinging said housing.

2. The improved L-shaped housing of claim 1, wherein the surfaces of said L-shaped housing at the crotch thereof form a seat for auxiliary equipment such as fluid containers, containers for the collection of refuse such as grass, leaves and the like, whereby said auxiliary equipment can be easily attached to and carried by said L-shaped housing.

3. The improved L-shaped housing of claim 1, wherein said L-shaped housing is pivotally attached and supported on said axle.

4. The improved L-shaped housing of claim 1, wherein said housing has the forward end of said horizontal leg releasably secured to said support frame to secure said housing in covering relationship therewith, said housing being pivotal upwardly and rearwardly independently of said support frame to expose said driven member and said drive mechanism when said forward end of said horizontal leg is released.

* * * * *